United States Patent
Chang

(10) Patent No.: US 10,716,445 B2
(45) Date of Patent: *Jul. 21, 2020

(54) AUTOMATIC CLEAN MACHINE CONTROL METHOD AND AUTOMATIC CLEAN MACHINE

(71) Applicant: PixArt Imaging Inc., Hsin-Chu (TW)

(72) Inventor: Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 182 days.

This patent is subject to a terminal disclaimer.

(21) Appl. No.: 15/980,658

(22) Filed: May 15, 2018

(65) Prior Publication Data

US 2018/0255998 A1  Sep. 13, 2018

Related U.S. Application Data

(63) Continuation of application No. 15/174,985, filed on Jun. 6, 2016, now Pat. No. 10,111,571.

(30) Foreign Application Priority Data

Jan. 28, 2016 (TW) .............................. 105102641 A

(51) Int. Cl.
*A47L 11/00* (2006.01)
*A47L 11/40* (2006.01)
*G05D 1/00* (2006.01)
*G05D 1/02* (2020.01)

(52) U.S. Cl.
CPC ........ *A47L 11/4011* (2013.01); *G05D 1/0088* (2013.01); *G05D 1/0274* (2013.01); *A47L 2201/06* (2013.01); *G05D 2201/0203* (2013.01)

(58) Field of Classification Search
CPC ............ A47L 11/00; A47L 11/40; G05D 1/00
See application file for complete search history.

(56) References Cited

U.S. PATENT DOCUMENTS

| 7,251,853 B2 * | 8/2007 | Park ...................... A47L 7/0061 |
| | | 15/319 |
| 7,438,766 B2 * | 10/2008 | Song .................... G05D 1/0219 |
| | | 134/18 |
| 9,534,899 B2 * | 1/2017 | Gutmann ............. G05D 1/0231 |
| 10,111,571 B2 * | 10/2018 | Chang ................. A47L 11/4011 |
| 2006/0076039 A1 * | 4/2006 | Song .................... G05D 1/0219 |
| | | 134/21 |

(Continued)

FOREIGN PATENT DOCUMENTS

| CN | 103479303 A | 1/2014 |
| CN | 104460663 A | 3/2015 |

(Continued)

*Primary Examiner* — Yonel Beaulieu
(74) *Attorney, Agent, or Firm* — Winston Hsu

(57) ABSTRACT

A computer readable recording media recording at least one program. An automatic clean machine control method is performed if the program is executed, which comprises: (a) input a drawing or a picture to an automatic clean machine by a first user, wherein the automatic clean machine acquires a map based on the drawing or the picture; (b) directly selecting a region to be cleaned on the map; and (c) controlling the automatic clean machine to perform a first clean operation to the region to be cleaned based on the map.

14 Claims, 10 Drawing Sheets

(56) References Cited

U.S. PATENT DOCUMENTS

| | | | |
|---|---|---|---|
| 2010/0256812 A1* | 10/2010 | Tsusaka | A47L 9/24 |
| | | | 700/254 |
| 2013/0326839 A1 | 12/2013 | Cho | |
| 2014/0207282 A1* | 7/2014 | Angle | G05B 15/02 |
| | | | 700/257 |
| 2019/0011923 A1* | 1/2019 | Xie | G05D 1/0219 |

FOREIGN PATENT DOCUMENTS

| | | |
|---|---|---|
| JP | 2014-206895 A | 10/2014 |
| WO | 2013/085085 A1 | 6/2013 |

* cited by examiner

AUTOMATIC CLEAN MACHINE CONTROL METHOD AND AUTOMATIC CLEAN MACHINE

CROSS REFERENCE TO RELATED APPLICATIONS

This application claims the benefit of applicant's earlier TWN application, Serial number 105102641, filed 2016 Jan. 28. Further, the application is a continuation of applicant's earlier application, Ser. No. 15/174,985, filed 2016 Jun. 6. The contents thereof are incorporated herein by reference.

BACKGROUND OF THE INVENTION

1. Field of the Invention

The present invention relates to an automatic clean machine control method and an automatic clean machine, and particularly relates to an automatic clean machine control method and an automatic clean machine which can control a clean region efficiently.

2. Description of the Prior Art

The technique for an automatic clean machine (ex. a robot vacuum cleaner) greatly improves recently, thus a price for the automatic clean machine becomes lower. Accordingly, many families apply the automatic clean machine to process most clean jobs.

However, a conventional automatic clean machine only can clean a fixed clean region. Complex setting must be provided to the automatic clean machine if such fixed clean region is desired to be changed. Alternatively, the automatic clean machine is manually moved or controlled (ex. remotely control in a visible range) to change the clean region.

Therefore, an automatic clean machine control method and an automatic clean machine which can efficiently control the clean region are needed.

SUMMARY OF THE INVENTION

Accordingly, one objective of the present invention is to provide an automatic clean machine control method thereby the user can easily select the region to be cleaned.

Another objective of the present invention is to provide an automatic clean machine thereby the user can easily select the region to be cleaned.

One embodiment of the present invention discloses: a computer readable recording media recording at least one program. An automatic clean machine control method is performed if the program is executed, which comprises: (a) input a drawing or a picture to an automatic clean machine by a first user, wherein the automatic clean machine acquires a map based on the drawing or the picture; (b) directly selecting a region to be cleaned on the map; and (c) controlling the automatic clean machine to perform a first clean operation to the region to be cleaned based on the map.

Another embodiment of the present invention discloses: an automatic clean machine comprising: a storage device, configured to store a map, wherein the automatic clean machine acquires the map based on a drawing input by a first user or based on a picture input by the first user; and a control circuit, configured to perform the following steps: (a) receiving a select signal generated via directly selecting a region to be cleaned on the map; and (b) controlling the automatic clean machine to perform a first clean operation to the region to be cleaned based on the map.

In view of above-mentioned embodiments, the user can easily control the automatic clean machine to clean a desired region. No complex setting or non-efficient conventional methods are needed for changing the clean region of the automatic clean machine. Besides, the user can control the automatic clean machine via a portable electronic device, thus the control becomes more convenient.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
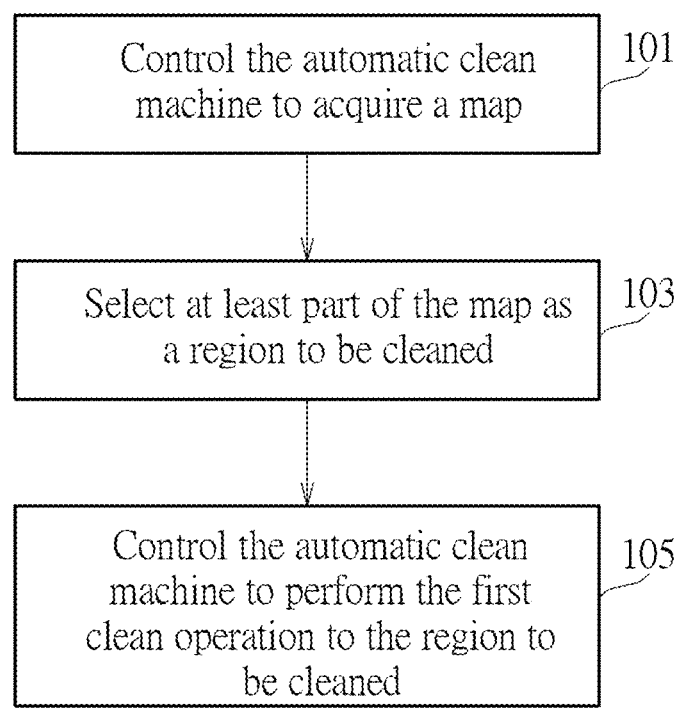
FIG. 1 is a flow chart illustrating an automatic clean machine control method according to one embodiment of the present invention.

FIG. 1 is a flow chart illustrating an automatic clean machine control method according to one embodiment of the present invention, which comprises following steps:

Step 101

Control the automatic clean machine to acquire a map.

Step 103

Select at least part of the map as a region to be cleaned.

Step 105

Control the automatic clean machine to perform the first clean operation to the region to be cleaned.

Please note, the first clean operation mentioned here is only for distinguishing from other clean operations. The term "first" mentioned here does not mean any order or any type. In following descriptions, several embodiments are provided for explaining each step.

Figure 2:
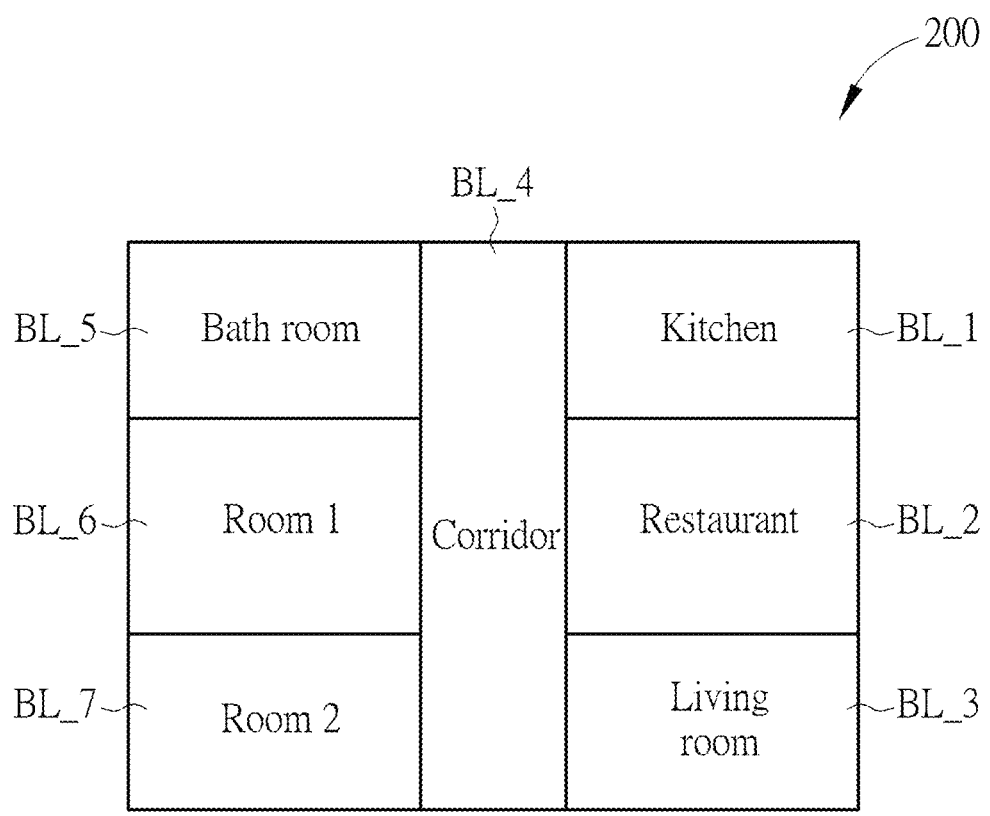
FIG. 2-FIG. 9 are schematic diagrams illustrating automatic clean machine control methods according to different embodiments of the present invention.
Figure 3:
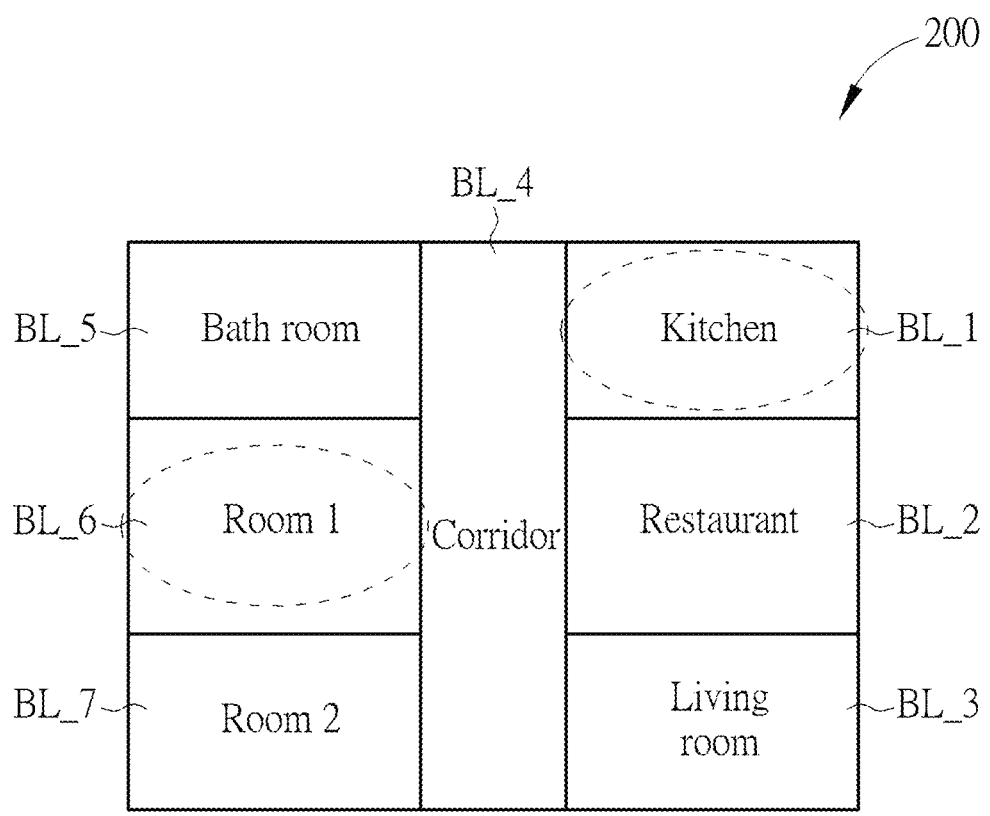

FIG. 2 illustrates an embodiment for the map. In such embodiment, the map 200 is a 2-dimensional figure, which illustrates blocks BL_1-BL_7 in the house. The blocks BL_1-BL_7 have different functions. A conventional automatic clean machine can only clean a fixed region, thus only a single block or neighboring blocks can be cleaned. For example, only the block BL_3 or neighboring blocks BL_2, BL_4 can be cleaned. However, the automatic clean machine control method provided by the present invention can provide a select function for the user, such that the user can select a block to be cleaned (i.e. the region to be cleaned in the above-mentioned step 103). Please refer to FIG. 3, in this embodiment the user selects blocks BL_1 and BL_6, which are not adjacent to each other. After that, the automatic clean machine will start to clean the selected blocks.

Many methods can be applied to select regions to be cleaned. For example, as shown in FIG. 2, many blocks are defined on the map and as least one block is selected as the region to be cleaned. In another example, no block is defined on the map, in such case the user can directly select the region to be cleaned on the map (ex. drawing a circle). In one embodiment, a user can generate a select signal to the automatic clean machine via a portable electronic device (ex. a mobile phone or a plate computer) to select the region to be cleaned. In one embodiment, the select signal is from an external device (ex. a remote controller), and responds to a clean command triggered by a user via the external device.

Figure 4:
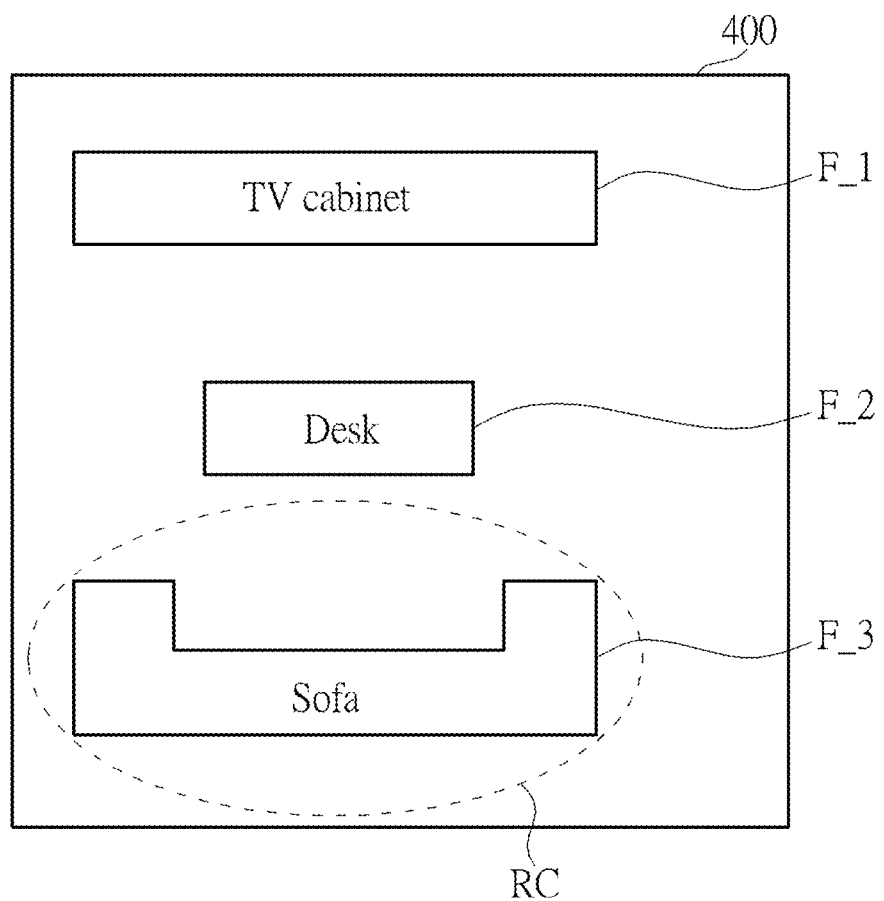
Figure 5:
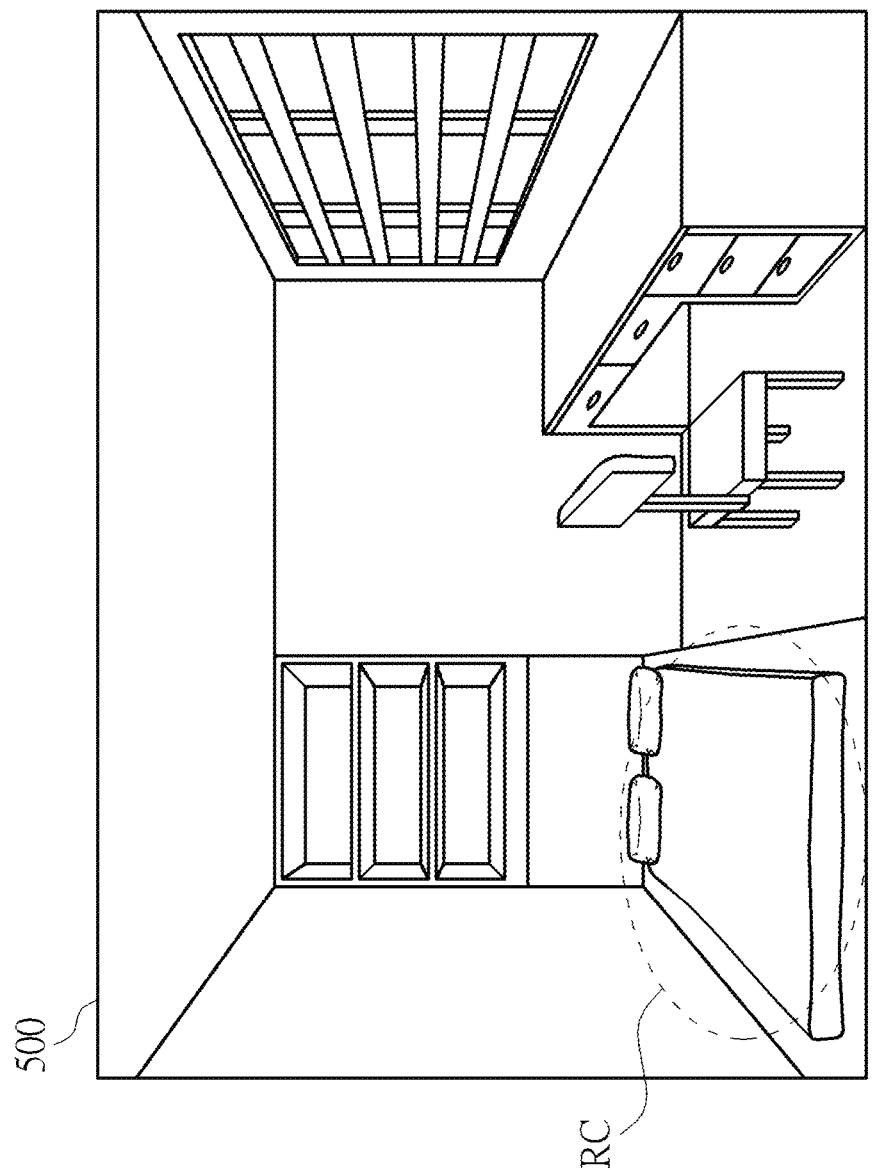

The map can be presented in many aspects and is not limited to the aspect illustrated in FIG. 2. FIG. 4 illustrates a map according to another embodiment. In such embodiment, the map is also a 2-dimensional figure. As illustrated in FIG. 4, the map 400 illustrates furniture F_1, F_2, F_3 in a living room. The user can select a region to be cleaned RC as illustrated in FIG. 4, and then the automatic clean machine will clean the region to be cleaned RC. Please note, the map can be a 3-dimensional map rather than limited to 2-dimensional figures illustrated in above-mentioned embodiments. As illustrated in FIG. 5, the map 500 is a 3-dimensional map. The user can select a region to be cleaned RC as illustrated in FIG. 5, and then the automatic clean machine will clean the region to be cleaned RC.

Figure 6:
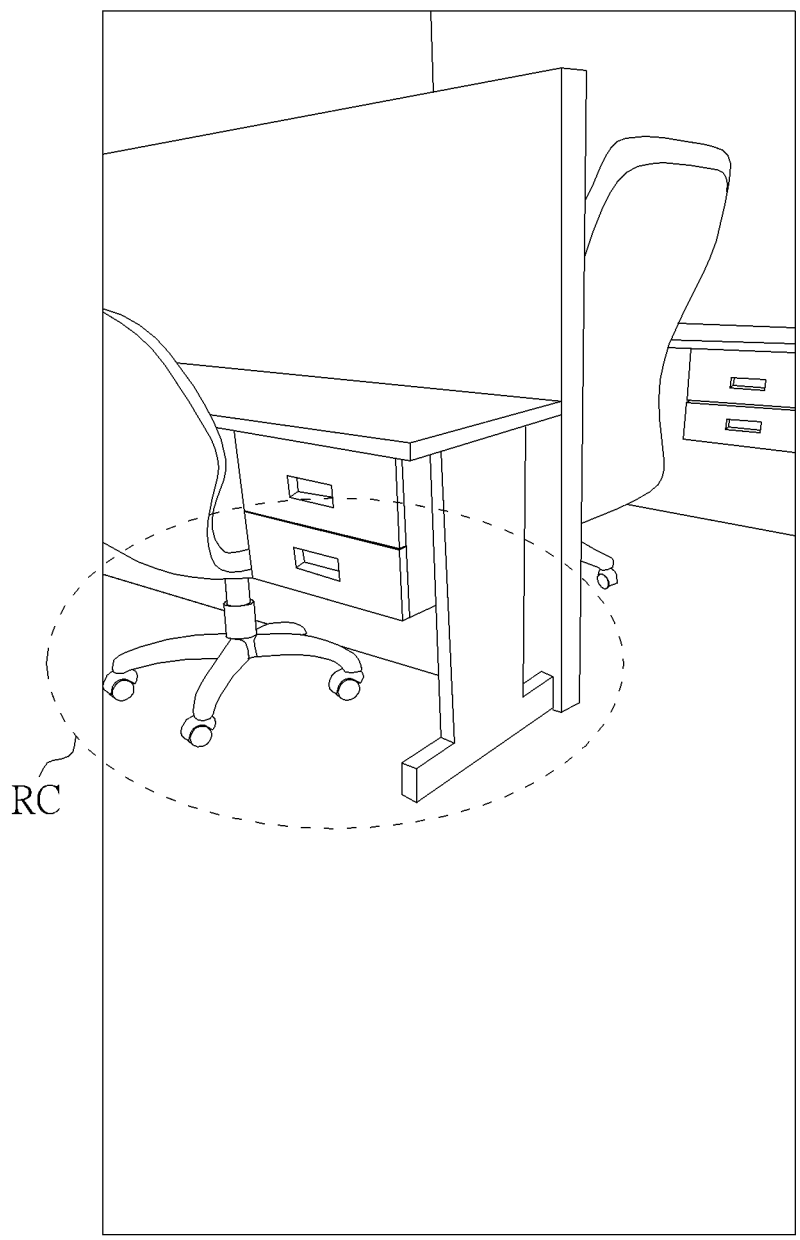

In view of above-mentioned embodiments, the map is generated via drawing. However, the map is not limited to be generated via such method. For example, the automatic clean machine always comprises a function of detecting a surrounding environment and a function of computing/recording a clean path. Accordingly, in one embodiment, the automatic clean machine automatically build the map based on at least one clean path recorded in the automatic clean machine or based on the detected surrounding environment. Alternatively, the map can be generated via a picture. As illustrated in FIG. 6, a picture is transmitted to the automatic clean machine and then the automatic clean machine builds a corresponding map according to the picture and accordingly plans a clean path. Therefore, after the user selects a region to be cleaned RC on the picture, the automatic clean machine can determine a region on the map corresponding to the region to be cleaned RC and accordingly perform a clean operation. In one embodiment, the map can be a combination of a picture and a 2-dimensional figure. For example, a 2-dimensional figure is firstly provided to the automatic clean machine, and then a picture is provided. Also, the relations between objects on the 2-dimensional figure and objects in the picture are defined. After that, the automatic clean machine can plan a more efficient clean path according to these relations.

An automatic clean machine always can detect if any obstacle exists nearby to plan a clean path. If the obstacle information can be provided to the automatic clean machine rather than generated via the automatic clean machine's detecting, efficiency for planning the clean path can be improved. Therefore, in one embodiment the obstacle information is provided to the map, and the automatic clean machine will plan the clean path according to the obstacle information, to perform above-mentioned first clean operation.

Figure 7:
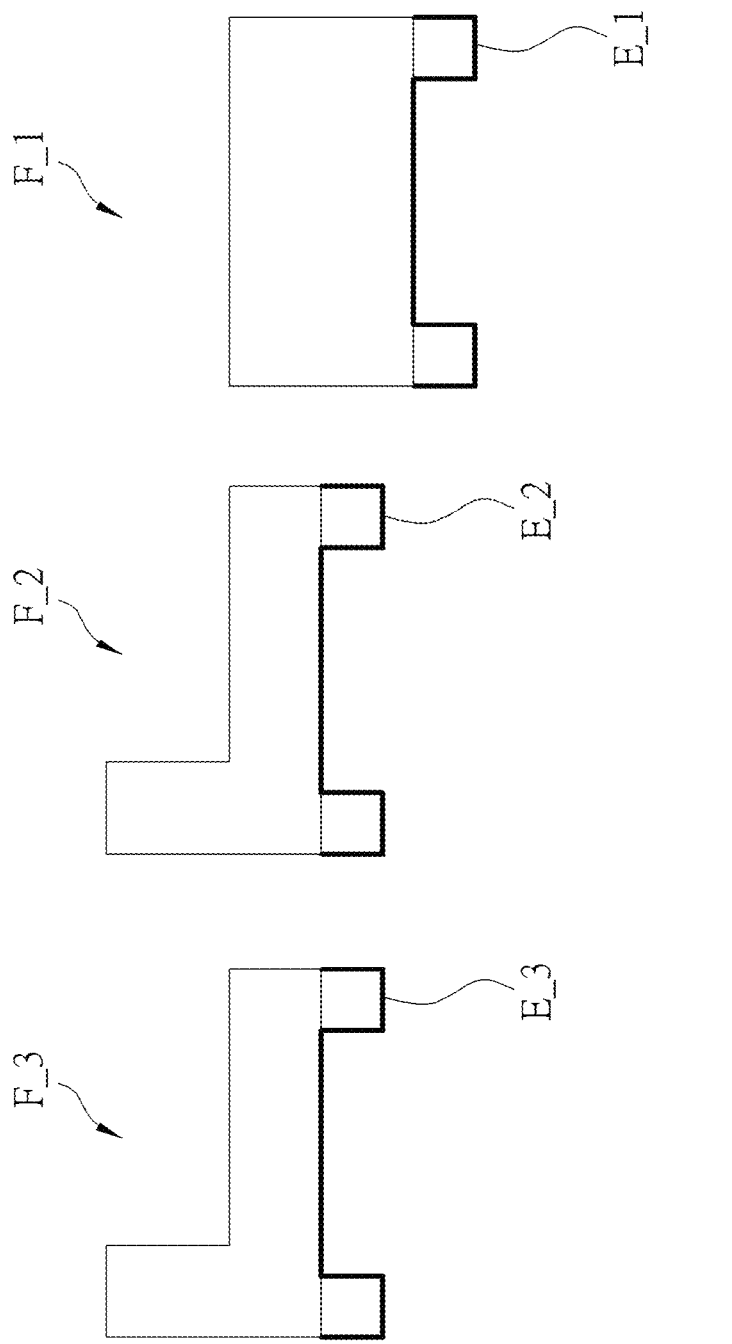

In one embodiment, the obstacle information can be provided to the automatic clean machine via following methods: a picture (generated by photo shooting), directly marking or generated by detecting surrounding environment via the automatic clean machine. Take FIG. 4 for example, in one embodiment the furniture F_1, F_2 and F_3 are directly marked on the map. Accordingly, the automatic clean machine will regard the furniture F_1, F_2 and F_3 as obstacles and plan a clean path to avoid these obstacles. Alternatively, as illustrated in FIG. 7, a 3-dimensional figure corresponding to FIG. 4 is provided, such that the automatic clean machine can identify these obstacles according to the 3-dimensional figure. Since the automatic clean machine always moves close to the ground and has a low height, the automatic clean machine does not need a whole shape of the obstacle. Accordingly, in such embodiment, only the edge information for the obstacles is provided to the automatic clean machine. Take FIG. 7 for example, only the information for edges E_1, E_2 and E_3 of the furniture F_1, F_2 and F_3 are provided to the automatic clean machine.

Figure 8:
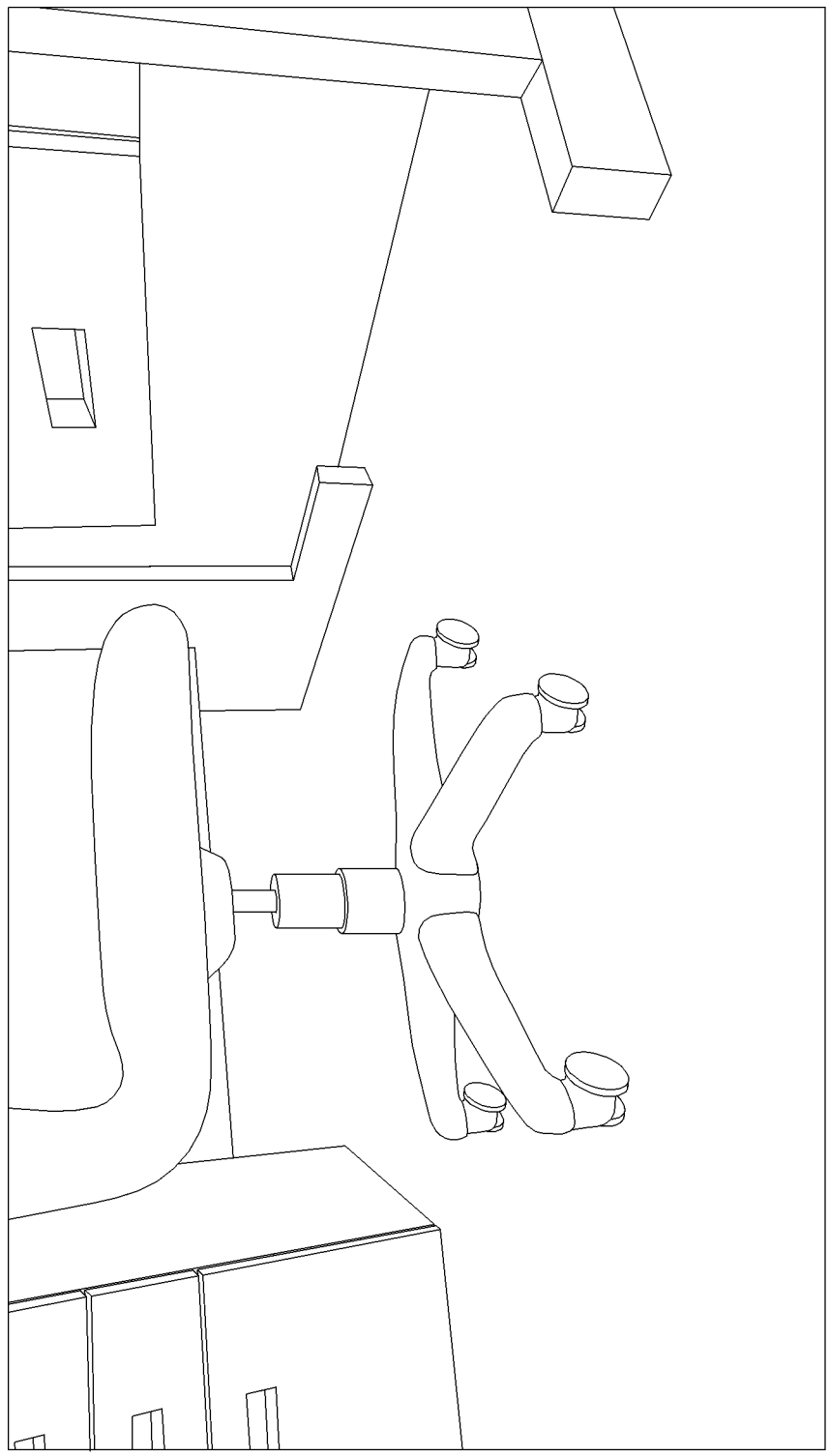

As above-mentioned, the obstacle information can be generated via a picture. As illustrated in FIG. 8, the obstacle information is provided to the automatic clean machine via a picture. By this way, the automatic clean machine can determine obstacles' locations and plan a clean path to avoid these obstacles. As above-mentioned the automatic clean machine always moves close to the ground and has a low height, the automatic clean machine does not need a whole shape of the object. Therefore, in such embodiment only the pictures comprising lower parts of the objects are provided to the automatic clean machine. Also, obstacles' locations can be determined and recorded via the above-mentioned method: the automatic clean machine detects surrounding environment, and plans/records a clean path.

In one embodiment, a guiding device generating a guiding signal (ex. a RF signal) is provided, such that the automatic clean machine can perform a second clean action according to the guiding signal. Please note the second clean operation described here is different from the above-mentioned clean operation which is performed based on the selecting of the user. Accordingly, such clean operation is named "a second clean operation" to be distinguished from the above-mentioned first clean operation, but the term "second" does not mean to limit the order or the type. The guiding signal is a signal responding to an active signal from the automatic clean machine, which is generated after the guiding device receives the active signal. In such embodiment, the guiding device generates the guiding signal after receives the active signal from the automatic clean machine and triggered by the active signal, rather than actively generate the guiding signal.

Figure 9:
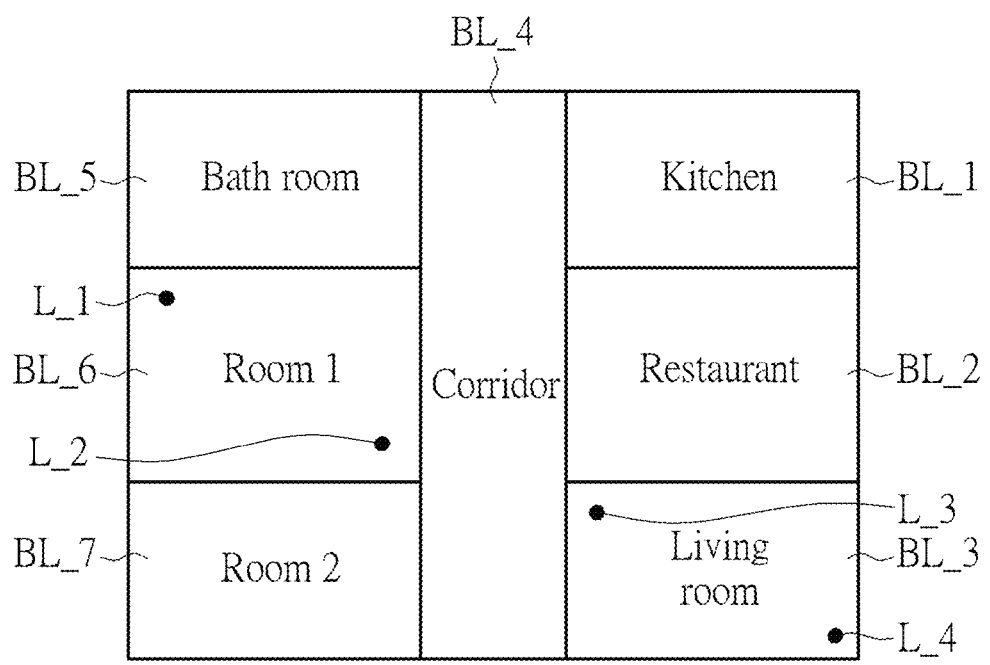

Please refer to FIG. 9. As illustrated in FIG. 9, guiding devices L_1, L_2, L_3 and L_4 are provided in blocks BL_1, BL_2, BL_3 and BL_4 for a house. The automatic clean machine cleans the neighboring regions for guiding devices L_1, L_2, L_3 and L_4 according to guiding signals of guiding devices L_1, L_2, L_3 and L_4. In one embodiment, the automatic clean machine takes back the guiding device after clean the neighboring regions for guiding devices. The taking back operation can be performed via various methods, for example, magnetic adsorption or reel.

Please note, the above-mentioned embodiments are not limited to be implemented together. For example, the automatic clean machine can plan the clean path only according to obstacle information but not according to the map. Besides, the embodiment that the automatic clean machine performs a clean operation according to a guiding signal from the guiding device can be independently implemented. The above-mentioned embodiments can be implemented via a computer readable recording media such as a hard disk or an optical disc. For example, store a program in the computer readable recording media and execute such program to implement above-mentioned embodiments.

Figure 10:
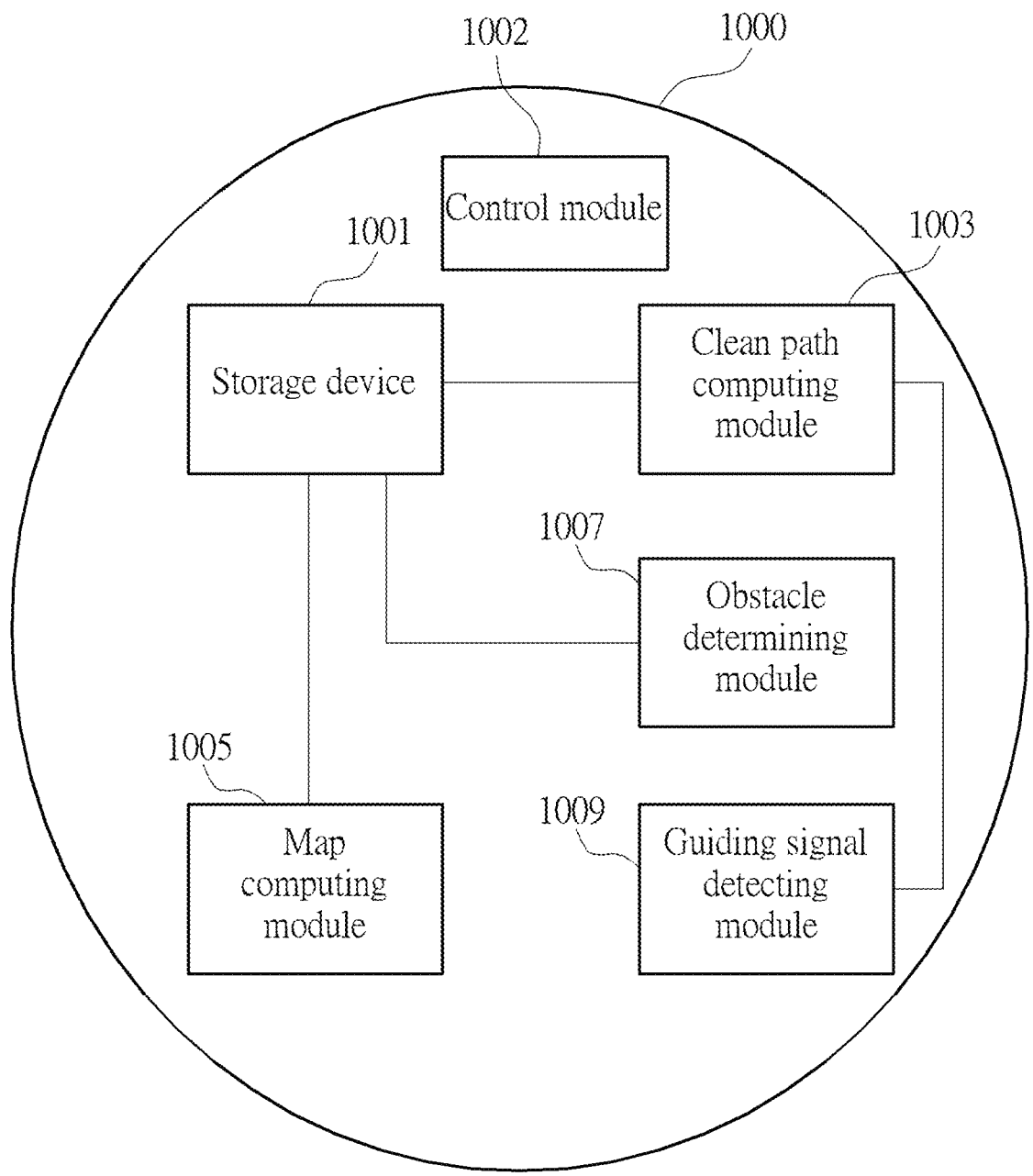
FIG. 10 is a block diagram illustrating an automatic clean machine according to one embodiment of the present invention.

FIG. 10 is a block diagram illustrating an automatic clean machine according to one embodiment of the present invention. As illustrated in FIG. 10, the automatic clean machine 1000 comprises: a storage device 1001, a control module 1002, a clean path computing module 1003, a map computing module 1005, an obstacle determining module 1007 and a guiding signal detecting module 1009. The storage device 1001 (ex. a memory) is configured to store above-mentioned map or obstacle information, which can come from an external source or generated by the map computing module 1005, the obstacle determining module 1007. The clean path computing module 1003 is configured to compute a clean path according to at least one of the map, the obstacle information and the guiding signal. The obstacle determining module 1007 is configured to determine a location of the obstacle according to the obstacle information, which can be acquired via receiving or computing. The guiding signal detecting module 1009 is configured to detect a guiding signal. The control module 1002 is configured to control the operations for the automatic clean machine 1000 and operations for modules in the automatic clean machine 1000, for example, receiving the above-mentioned select signal and controlling the automatic clean machine 1000 to perform a clean operation according to the clean path generated by the clean path computing module 1003.

Please note, the devices and the connection in FIG. 10 are only for example and do not mean to limit the scope of the present application. Persons skilled in the art can vary the devices and connection in FIG. 10 according to above-mentioned embodiments. For example, the obstacle determining module 1007 can directly connect to the clean path computing module 1003 but not connect to the storage device 1001. Alternatively, if the map is provided only via an external source, the map computing module 1005 can be removed from the automatic clean machine 1000. The control module 1002, the clean path computing module 1003, the map computing module 1005, the obstacle determining module 1007 and the guiding signal detecting module 1009 can be implemented by hardware (ex. a circuit) or hardware with software. In one embodiment, different software is written into a processor to implement the functions of different modules.

In view of above-mentioned embodiments, the user can easily control the automatic clean machine to clean a desired region. No complex setting or non-efficient conventional methods are needed for changing the clean region of the automatic clean machine. Besides, the user can control the automatic clean machine via a portable electronic device, thus the control becomes more convenient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer readable recording media, recording at least one program, an automatic clean machine control method is performed if the program is executed, which comprises:
   (a) input a drawing or a picture to an automatic clean machine by a first user, wherein the automatic clean machine acquires a map based on the drawing or the picture;
   (b) directly selecting a region to be cleaned on the map; and
   (c) controlling the automatic clean machine to perform a first clean operation to the region to be cleaned based on the map.

2. The computer readable recording media of claim 1, wherein the step (a) controls the automatic clean machine to automatically build the map based on at least one clean path recorded in the automatic clean machine.

3. The computer readable recording media of claim 1, wherein the map is a 2-dimensional drawing or a 3-dimensional drawing.

4. The computer readable recording media of claim 1, wherein the automatic clean machine control method further comprises:
   providing obstacle information on the map;
   wherein the step (c) controls the automatic clean machine to plan a clean path according to the obstacle information to perform the first clean operation.

5. The computer readable recording media of claim 4, wherein the obstacle information comprises an edge for at least one object comprised in the map.

6. The computer readable recording media of claim 4, wherein the obstacle information is provided on the map via directly marking on the picture.

7. The computer readable recording media of claim 4, wherein the obstacle information is provided by detecting a surrounding environment via the automatic clean machine.

8. An automatic clean machine, comprising:
   a storage device, configured to store a map, wherein the automatic clean machine acquires the map based on a drawing input by a first user or based on a picture input by the first user; and
   a control circuit, configured to perform the following steps:
      (a) receiving a select signal generated via directly selecting a region to be cleaned on the map; and
      (b) controlling the automatic clean machine to perform a first clean operation to the region to be cleaned based on the map.

9. The automatic clean machine of claim 8, further comprising a map computing circuit, wherein the map is established based on at least one clean path recorded in the automatic clean machine via the map computing circuit.

10. The automatic clean machine of claim 8, wherein the map is a 2-dimensional drawing or a 3-dimensional drawing.

11. The automatic clean machine of claim 8,
    wherein the map further comprises obstacle information;
    wherein the step (b) controls the automatic clean machine to plan a clean path according to the obstacle information to perform the first clean operation.

12. The automatic clean machine of claim 11, wherein the obstacle information comprises an edge for at least one object comprised in the map.

13. The automatic clean machine of claim 11, wherein the obstacle information is provided on the map via directly marking on the picture.

14. The automatic clean machine of claim 11, wherein the obstacle information is provided by detecting a surrounding environment via the automatic clean machine.

* * * * *